United States Patent [19]

Weiser et al.

[11] Patent Number: 5,393,828
[45] Date of Patent: Feb. 28, 1995

[54] CHEMICAL DEGRADATION OF CURED AMINO RESINS

[75] Inventors: Juergen Weiser, Schriesheim; Wolfgang Reuther; Erwin Hahn, both of Heidelberg, all of Germany

[73] Assignee: BASF Aktiengesellschaft, Ludwigshafen, Germany

[21] Appl. No.: 163,715

[22] Filed: Dec. 9, 1993

[30] Foreign Application Priority Data

Dec. 14, 1992 [DE] Germany ............................ 4242046

[51] Int. Cl.⁶ .................................................. C08G 63/91
[52] U.S. Cl. ..................................................... 525/25
[58] Field of Search ........................................ 525/25

[56] References Cited

U.S. PATENT DOCUMENTS

| | | | |
|---|---|---|---|
| 3,859,243 | 1/1975 | Blasing, Jr. ........................ | 528/254 |
| 4,088,620 | 5/1978 | Nihongi et al. ................... | 260/29.4 |
| 4,202,959 | 5/1980 | Henbest et al. .................. | 528/254 |
| 4,334,971 | 6/1982 | Mahnke et al. ................. | 204/159.21 |
| 4,886,882 | 12/1989 | Ebel et al. ........................ | 544/196 |
| 5,084,488 | 1/1992 | Weiser et al. .................... | 521/187 |

FOREIGN PATENT DOCUMENTS 2073553 1/1993 Canada.
221330 5/1987 European Pat. Off..

OTHER PUBLICATIONS

*Chem. Abst.*, vol. 92, No. 6, Feb. 11, 1980, Abst. No. 44355y.
*Chem. Abst.*, vol. 114, No. 20, May 20, 1991, Abst. No. 187239x.

*Primary Examiner*—John Kight, III
*Assistant Examiner*—Richard Jones
*Attorney, Agent, or Firm*—Keil & Weinkauf

[57] ABSTRACT

A process for chemically degrading cured amino resins comprises reacting cured amino resins, which may contain fillers, with a primary and/or secondary amine at from 40° to 250° C.

6 Claims, No Drawings

CHEMICAL DEGRADATION OF CURED AMINO RESINS

DESCRIPTION

The present invention relates to a process for chemically degrading cured amino resins which is suitable in particular for recycling shaped articles comprising cured amino resins.

There are various ways of recycling polymers. One method which has come to be popular involves mechanically comminuting the ideally single-kind polymer and then subjecting it to a thermoplastic reshaping. However, with cured amino resins this can only be done to a limited extent. True, cured amino resins can be mechanically comminuted, but they cannot be thermally reshaped. The only option is to use suitable additives to bond the ground resin powder together to form new shaped articles.

The class of amino resins also includes urea and triazine resins. Such resins are predominantly made into shaped articles such as fibers or foams (cf. U.S. Pat. No. 4,088,620, U.S. Pat. No. 4,202,959, U.S. Pat. No. 4,334,971, EA 2,073,553 and U.S. Pat. No. 5,055,162). Hence the question does arise as to how to recycle these products.

It is an object of the present invention to devise a process for chemically degrading of cured amino resins which permits the chemical recycling of shaped articles comprising amino resins.

We have surprisingly found that this object is achieved when cured amino resins are treated with primary and/or secondary amines to cleave them into urea or triazine derivatives.

The present invention accordingly provides a process for chemically degrading cured amino resins which comprises reacting cured amino resins, which may contain fillers, with a primary and/or secondary amine at from 40° to 250° C.

For the purposes of the present invention cured amino resins include for example condensation products of urea, melamine, benzoguanamine, acetoguanamine, dicyandiamide, guanidine or thiourea with aldehydes, in particular with formaldehyde.

Preferred amino resins are urea and/or triazine resins. In the triazine resins, the triazine component is selected for example from benzoguanamine, acetoguanamine and melamine.

Preference is given to using melamine resins. Particularly preferred melamine resins are the condensation products of melamine or melamine derivatives with formaldehyde as described for example in EP A 221 330 and U.S. Pat. No. 5,084,488.

The amino resin used in the process of the invention is generally obtained by mechanically comminuting shaped amino resin articles such as fibers or foams. The resulting finely divided amino resin can then be used in the process of the invention without further pretreatment.

In this there is generally no interference from the fillers present in the shaped amino resin articles.

Fillers are generally fiber- or powder-form inorganic reinforcing agents or fillers, such as glass fibers, metal powders, metal salts or silicates, e.g. kaolin, talc, baryte, quartz or chalk, also pigments and dyes and flame retardants.

According to the invention, the cured amino resin is reacted with the desired amine at from 40° to 250° C., preferably at from 100° to 200° C.

The process of the invention uses primary and/or secondary amines. The invention accordingly provides for the use of amines from the group of the primary and secondary alkyl- and aryl-amines and of the polyamines in which at least one amine function has a hydrogen atom. The amines may be substituted.

Preference is given to working under an inert gas such as nitrogen or argon.

To increase the reaction temperature when using low boiling amines it is possible to employ superatmospheric pressure. In this case gaseous reaction products can be removed from the reaction vessel via an overflow valve.

Advantageously the process of the invention is carried out using an excess of amine, in particular in the case of polyamines. In the case of melamine-formaldehyde resins having an average molecular weight of about 200 for the smallest monomer unit as also in the case of urea-formaldehyde resins having an average molecular weight for the smallest monomer unit of about 90, generally at least 3 mol of amine is added per mole of monomer units.

The process of the invention can also be carried out in the presence of an inert solvent.

Suitable for this purpose are for urea resins for example pyridine or halogenated aromatics and for melamine resins for example alcohols, in particular glycols. The weight ratio of amine, or of the sum of amine and solvent:resin is preferably within the range from 1 to 50, particularly preferably from 10 to 20. The amount of solvent used is such that the solution can still be adequately stirred.

The reaction time is generally from 1 to 72 hours and is dependent on the reaction temperature, the surface area of the resin used and on the polarity of the amine used. Preferred reaction times range from 12 to 24 hours.

In the case of urea resins, hydroxy-functional amines can give rise to secondary reactions. Carbamates may be formed. However, if carbamate formation is desirable, alcohols can be used.

In the case of triazine resins the addition of an acid catalyst is advantageous. Suitable acid catalysts are all strong and medium acids, e.g. hydrochloric acid, sulfuric acid, nitric acid, phosphoric acid, amidosulfuric acid or p-toluenesulfonic acid. The acids can be added either in free form or as melamine or amine salt. Furthermore, they can also be added as the salt of a base which is weaker than the amine used (e.g. ammonium salts). It is also possible to use Lewis acids.

If urea resins are used, then polar amines (such as alkanolamines, alkoxyamines) and temperatures from 140° to 160° C. frequently produce clear solutions within a few hours. Distillation of the excess amine or solvent leaves a generally clear, viscous residue composed of the individual monomers. They can be purified, for example by crystallization.

If triazine resins are used, temperatures from 180° to 200° C. and addition of an acid frequently give clear solutions within from 1 to 3 hours. The progress of the transamidation reaction can be monitored by chromatographic methods. Depending on the desired degree of conversion, the reaction can be terminated by cooling, the acid neutralized with alkali, possibly the salt separated off and the excess amine or solvent distilled off.

The residue comprises one or more monomers of the corresponding triazines.

Cured amino resins, in particular melamine resins, can be converted by the process of the invention, depending on the functionality of the amine used, into correspondingly functionalized monomeric derivatives which are simple to isolate and can be used for various chemical processes. An example thereof is the use as a modifying component in melamine-formaldehyde resins as described in U.S. Pat. No. 4,334,971, U.S. Pat. No. 4,088,620, EP-A-221 330 and EA 2,073,553.

This makes it possible to recycle shaped amino resin articles in a simple and economical manner.

EXAMPLE 1

400 g of 2,2'-aminoethoxyethanol and 10 g of ammonium chloride were introduced as the initial charge and heated to 150° C. under nitrogen. 20 g of a ground, cured melamine resin having a molar ratio of melamine to formaldehyde of 1:3 were added a little at a time. The reaction temperature was increased to 200° C. After 1 h a clear solution formed. 12 hours after reaching the 200° C. mark the reaction was terminated by cooling down to 100° C. 15 g of 50% strength NaOH were added for neutralization and the resulting salt was filtered off. The excess amine was distilled off under reduced pressure. The residue (36.8 g) was according to HPLC analysis (evaluation of the areas):

23 mol % of monohydroxyoxapentylmelamine,
  53 mol % of dihydroxyoxapentylmelamine, and
  22 mol % of trihydroxyoxapentylmelamine.

EXAMPLE 2

15 g of a ground, cured urea resin having a molar ratio of urea:formaldehyde of 1:1.1 were refluxed in 47 g of 1-amino-3-propanol under nitrogen for 10 hours. The excess amine was distilled off. The residue was according to HPLC analysis and quantitative $^{13}$C-NMR analysis:

6 mol % of urea,
  42 mol % of monohydroxypropylurea, and
  51 mol % of bishydroxypropylurea.

We claim:

1. A process for chemically degrading cured amino resins, which comprises reacting at least one cured amino resin with at least one amine selected from the group consisting of primary alkylamines, primary arylamines, secondary alkylamines, secondary arylamines; and alkanolamines, alkoxyamines, and polyamines in which at least one amine function has a hydrogen atom at from 40° to 250° C., wherein the amine is in molar excess related to the smallest monomer unit in the cured amino resin.

2. The process of claim 1, wherein the cured amino resin is at least one resin selected from the group consisting of a urea resin and a triazine resin.

3. The process of claim 2, wherein the cured amino resin is a melamine resin.

4. The process of claim 1, wherein the cured amino resin contains fillers.

5. The process of claim 1, wherein the amine is 2,2'-aminoethoxyethanol.

6. The process of claim 1, wherein the amine is 1-amino-3-propanol.

* * * * *